(12) United States Patent
Dexter

(10) Patent No.: US 11,007,854 B2
(45) Date of Patent: May 18, 2021

(54) VEHICLE SUNSHADE ASSEMBLY WITH MAGNETIC COUPLER

(71) Applicant: Tim Dexter, Orland, CA (US)

(72) Inventor: Tim Dexter, Orland, CA (US)

( * ) Notice: Subject to any disclaimer, the term of this patent is extended or adjusted under 35 U.S.C. 154(b) by 80 days.

(21) Appl. No.: 16/543,762

(22) Filed: Aug. 19, 2019

(65) Prior Publication Data

US 2020/0055380 A1  Feb. 20, 2020

Related U.S. Application Data

(60) Provisional application No. 62/764,792, filed on Aug. 17, 2018.

(51) Int. Cl.
*B60J 3/02* (2006.01)
*B60J 7/00* (2006.01)

(52) U.S. Cl.
CPC .................. *B60J 7/0023* (2013.01)

(58) Field of Classification Search
CPC ... B60J 7/0023; B60J 7/10; B60J 7/102; B60J 7/104
USPC .................. 296/214, 218, 121; 160/404, 383
See application file for complete search history.

(56) References Cited

U.S. PATENT DOCUMENTS

| | | | | |
|---|---|---|---|---|
| 3,960,197 A | * | 6/1976 | Daniels | A47G 1/0605 160/371 |
| 8,641,136 B2 | * | 2/2014 | Kring | B60R 13/0275 296/214 |
| 9,950,598 B2 | * | 4/2018 | Stickles | B60J 7/1291 |
| 2019/0344647 A1 | * | 11/2019 | Matras | B60J 7/104 |

* cited by examiner

*Primary Examiner* — Dennis H Pedder
(74) *Attorney, Agent, or Firm* — Tracy M Heims; Apex Juris, pllc

(57) ABSTRACT

A vehicle sunshade including a foldable screen dimensioned for mounted coverage of a vehicle roof top opening with a leading edge dimensioned for removable attachment to a front periphery of the opening and a rear portion adapted for removable mounted engagement with a corresponding rear portion of the opening and having a magnetic coupling portion extending in a width direction from opposing side edges in substantially parallel alignment to the leading edge such that magnetic coupling of the magnetic coupling strip with the leading edge detachably affixes the sunshade to cover the opening and an interposed live hinge having a front panel flexibly pivotable about a hinge line thereby providing a taut and continuous planar surface when the magnetic coupling portion is coupled and enabling the front panel to fold back over an abutted surface of the rear panel when the magnetic coupling strip is decoupled.

20 Claims, 4 Drawing Sheets

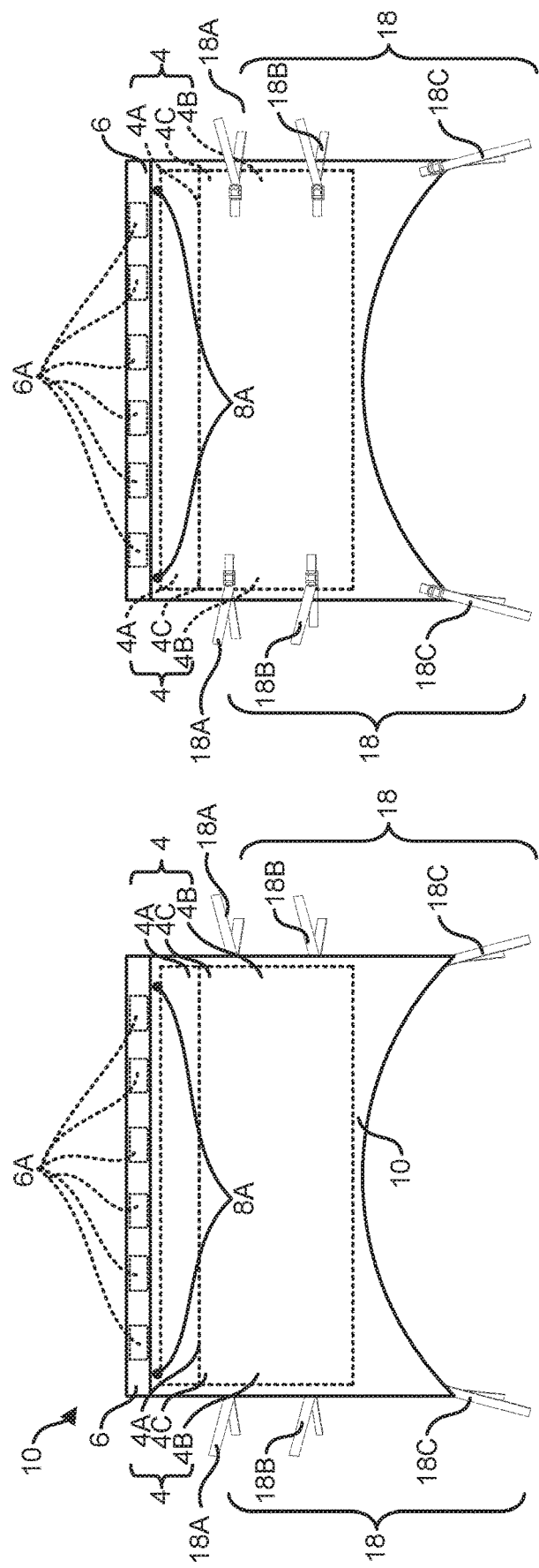

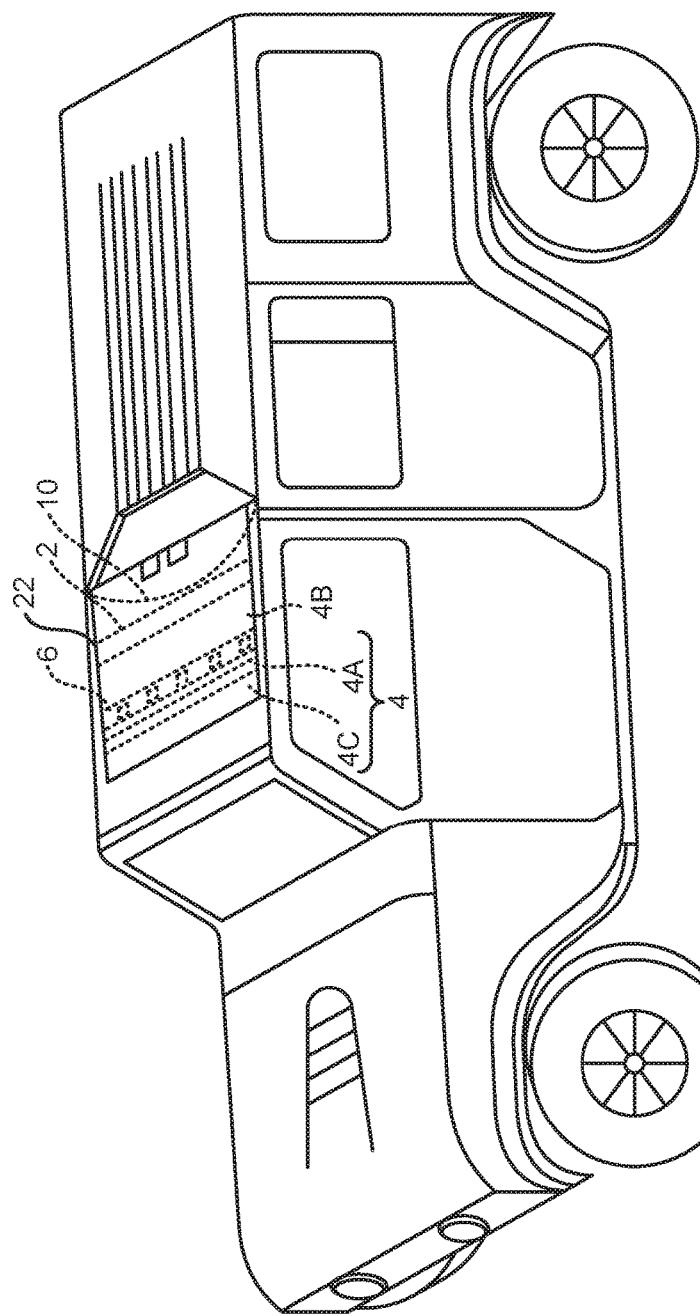
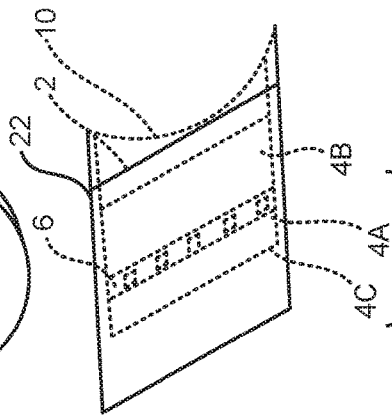

VEHICLE SUNSHADE ASSEMBLY WITH MAGNETIC COUPLER

CROSS-REFERENCE TO RELATED APPLICATIONS

This Application claims priority to and benefit under 35 USC § 119(e) of U.S. Provisional Patent Application Ser. No. 62/764,792 having a filing date of Aug. 17, 2018, which is hereby incorporated by reference herein.

FIELD OF THE INVENTION

The invention relates generally to sunshades for open roofs of vehicles, and more particularly to a sunshade including a foldable screen and magnetic closure system.

BACKGROUND

Open roof sunshades are very popular with owners of sport utility and similar vehicles. Among other things, they offer the owner the option of being able to shade or screen the sun while maintaining an open roof top for ventilation and fresh air experience. To readily accommodate changing weather conditions and glare emitted and reflected from the sun as well as roadside and other vehicles lamps, it is important that the design of the top be easy and convenient to operate in order or facilitate expeditious positioning of the sunshade between use and folded positions. It is also desirable that minimal space is used when the sunshade is not in use and that the hardtop may be readily accessible, particularly during sudden onsets of rain and inclement weather.

Conventional soft panel top assemblies for vehicles typically include a frame, typically foldable, with a soft convertible top that may be tautly assembled when the frame is pulled or pivoted to an upright or extended position. Prior art soft tops may also include a sunshade cover typically extended along opposing rails to an unwound position over a roof opening and wound about a rotatable shaft in a winding tube in a folded position such as described U.S. Pat. Nos. 9,067,480 and 10,099,543. Such existing sunscreen assemblies typically include multiple layers of flexible fabric imparting a bulky construction. Moreover, frames or winding mechanisms of conventional vehicle sunshades for an open vehicle roof often require disassembly and storage to provide necessary clearance for placement of a hard top on the opening.

As a result, such conventional sunshades and soft panel vehicle roof top assemblies are bulky, require multiple steps to assemble, extend and store and lack a streamlined, facile application enabling ready closure when extended to a use position and minimal space leaving clearance for securing a hard top without requiring removal or disassembly.

Accordingly, there persist an ongoing need for a streamlined, compact and facile sunshade for roof top openings that does not detract from the experience of operating the vehicle roof top cover components and the feel of outdoor air.

SUMMARY OF THE INVENTION

In order to better address the foregoing drawbacks and desires, the invention, in one aspect, a magnetically coupled sunshade for a vehicle roof top opening with a particular application to a sport utility vehicle. The sunshade includes a foldable screen composed of lightweight, flexible, and preferably breathable, fabric such as a mesh material and a magnetic coupler for facile securing of the top in an extended use position covering roof top opening of the interior of the vehicle and ready decoupling for folding back in a storage, disengaged position. Other features of representative embodiments of the present invention include a live hinge interposed in the foldable screen such that a front panel proximate to a leading edge and a rear panel flexibly pivot about a hinge line. The sunshade is further adaptable to be maintained in a flat, folded position wherein the mountable rear portion remains secured to the rear portion of the roof top opening so the vehicle hard top may be secured to latches along a top crossbar of a vehicle so as to provide safe, ready and facile interchanging of the sunshade and hard top covers of the vehicle roof top in efficient operation between open and closed positions.

The present sunshade for a vehicle roof top opening includes a foldable screen configured for mounted coverage of the opening, wherein the foldable screen has a front portion having a leading edge dimensioned for removable attachment to a front periphery of the opening and a rear portion extending along a continuously integrated surface spaced a predetermined distance behind the leading edge, wherein the rear portion is adapted for removable mounted engagement with a corresponding surface portion proximate to a side periphery and a rear periphery of the opening wherein the rear portion is adapted for removable mounted engagement with a corresponding surface portion proximate to a side periphery and a rear periphery of the opening, and a coupling portion or strip including one or more magnets dimensioned and spaced to securely couple the leading edge to a corresponding metallic bar located along a front periphery of the opening such that magnetic coupling of the coupling portion and the metallic bar detachably secures the leading edge to the metallic bar whereby the sunshade is extended to cover the opening. The magnetic coupling portion of exemplary embodiments may be integrated into the leading edge or provided in the form of a strip containing magnets or a magnetic material, interposed in substantially parallel alignment along the leading edge of the foldable screen. The coupling portion extends along or proximate to the leading edge and is interposed with magnets. The foldable screen may be composed of any suitably flexible yet durable material of a thickness and color capable of diminishing the brightness and glare emitted from the sun or other light source to thereby provide shade for the occupants of a vehicle. In preferred embodiments, foldable screen is composed of an open pore material or mesh wherethrough outdoor air can pass and thus provide ventilation within the interior of the vehicle. In embodiments where the composition of the foldable screen is integrated in the coupling portion such as in a hem or interposed strip or patch(es), the open pore fabric or mesh further minimizes obstructing at least a portion of the magnetic field emitted by the magnets so as to optimally secure the coupling interface of magnetic coupling strip and metallic bar.

The sunshade preferably includes a live hinge interposed in the foldable screen, wherein the live hinge containing a front panel spaced a predetermined distance behind the leading edge and a rear panel having a coextensive adjoining edge aligned with a back edge of the front panel, wherein the rear panel flexibly pivots about a hinge line such that the front panel and the rear panel form a substantially continuous planar surface when the magnetic coupler is coupled with the metallic frame and the front panel folds back in a single planar layer over an abutting surface of the rear panel when the magnetic coupler is decoupled.

In some embodiments, the magnetic coupling portion is a strip including a plurality of magnets containing neodymium. The magnets may be sewn in spaced intervals in a hem along the leading edge of the foldable panel. Preferred embodiments enable the foldable screen to be affixed within a periphery of the roof top opening such that a vehicle hard top for the roof top opening may be secured to cover the opening in a closed position covering the roof top opening without dismantling the sunshade.

A yet further feature of the sunshade employs one or more locator members for guiding the coupling strip into aligned coupling with the metallic bar. In preferred embodiments, the locator members are a pair of pins proximate to the leading edge and a pair of ports proximate to the metallic bar dimensioned for mated engagement with the pair of pins.

The sunshade may be mounted by securing the side and rear edges of the rear portion of the foldable screen to corresponding surfaces adjacent the corresponding peripheral edges of the roof top opening. In one exemplary embodiment, a plurality of straps are affixed to opposing sides and rear portions of the foldable screen, wherein the plurality of straps are dimensioned and oriented for adaptably securing the sunshade on to surfaces adjacent to the sides and rear periphery of the opening. However, various other fastening devices and systems may be employed to mount the sunshade, including, for example, locking pins, clips or clasps, or latch systems.

It is further contemplated that the sunshade of the present invention may be employed in conjunction with hard roof tops such as sun roofs and moon roofs that are equipped with automated or manual systems that lift or slide open without removing the hard top cover from the roof top.

BRIEF DESCRIPTION OF THE DRAWINGS

The accompanying drawings, which are incorporated in and constitute a part of this specification, illustrate embodiments of the invention and, together with the description, serve to explain the principles of the invention; and, furthermore, are not intended in any manner to limit the scope of the invention.

FIG. 3 illustrates a top perspective view of a vehicle sunshade for a roof top opening in accordance with a representative embodiment of the present invention when not mounted to a vehicle roof top opening.

FIG. 3A illustrates a bottom perspective view of a vehicle sunshade for a roof top opening in accordance with a representative embodiment of the present invention when not mounted to a vehicle roof top opening constituting the underside of the sunshade when mounted to a roof top opening.

FIG. 4 illustrates a side perspective view of a vehicle sunshade for a roof top opening in accordance with a representative embodiment of the present invention with the vehicle hard top cover installed in the roof top opening.

FIG. 4A illustrates a top perspective view of a vehicle sunshade with the hard top cover overlaid thereon.

DETAILED DESCRIPTION OF THE EXEMPLARY EMBODIMENTS

The disclosed subject matter will become better understood through review of the following detailed description in conjunction with the figures. The detailed description and figures provide example embodiments of the invention described herein. Those skilled in the art will understand that the disclosed examples may be varied, modified, and altered without departing from the scope of the invention described herein.

Throughout the following detailed description, representative examples of features of the vehicle sunshade are disclosed to illustrate aspects of the claimed invention. Related features in the examples may be identical, similar, or dissimilar. The reader should understand that a given feature need not be the same or similar to the specific portrayal. It should therefore be understood that the representative embodiment illustrated in FIGS. 1-4A is adapted to a sport utility vehicle commercially known as a Jeep® and specifically a four door Jeep Wrangler®. However, it should be understood that the claimed and described features of other embodiments of the claimed invention may be adaptable to other automobiles including sedans, trucks and crossover vehicles as well as motorhomes and trailers.

Figure 1:
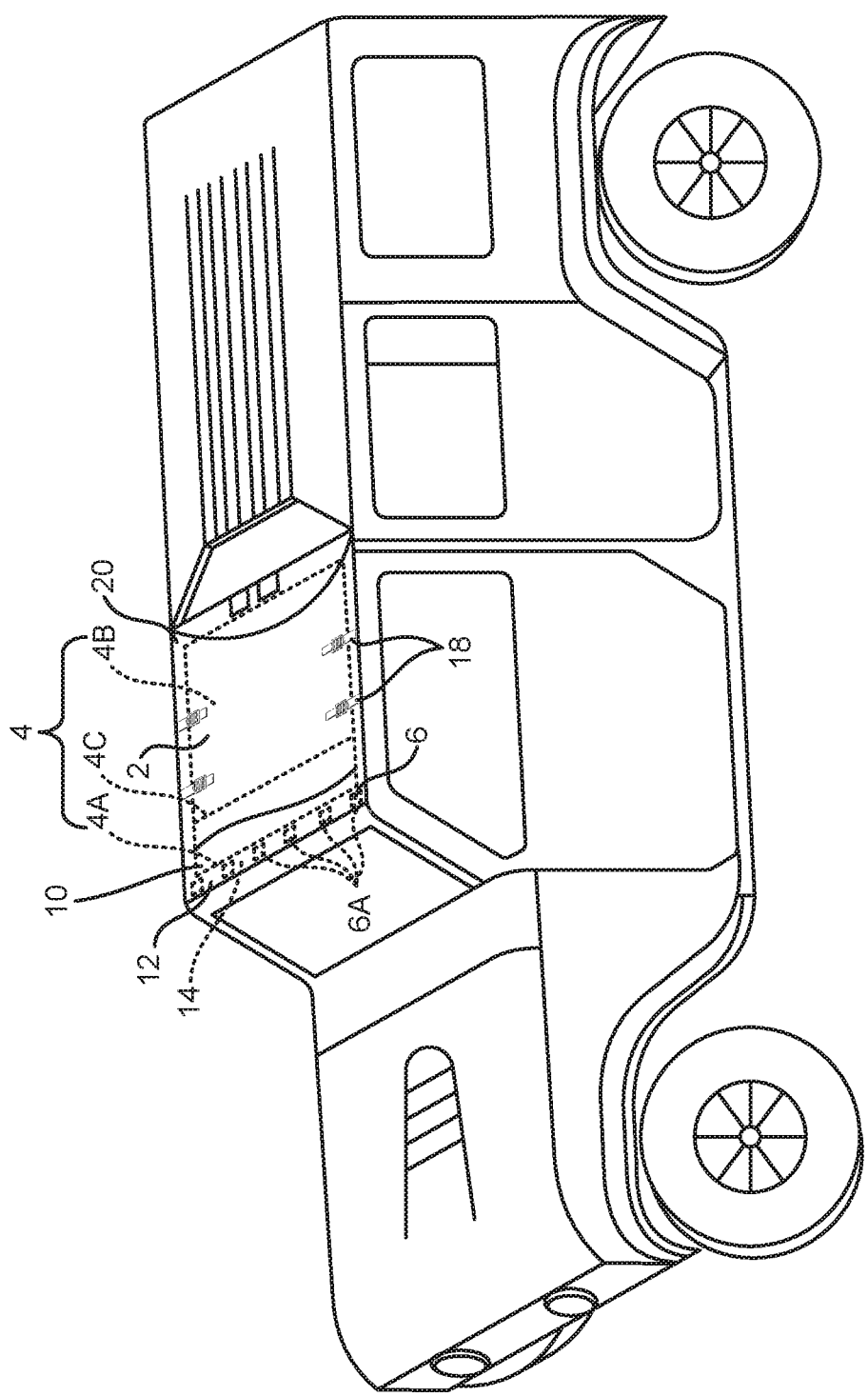
FIG. 1 illustrates a side perspective view of a vehicle sunshade for a roof top opening in accordance with a representative embodiment of the present invention extended in a use position.

Now referring to the various figures illustrating an exemplary embodiment of the claimed invention, vehicle sunshade 10 includes foldable screen 2 dimensioned to cover the roof top opening 20 of a vehicle. FIG. 1 illustrates foldable screen 2 when extended to cover roof top opening 20. As illustrated, foldable screen 2 has a leading edge 12 dimensioned for removable coupling to a peripheral metallic member 14 traversing the front edge of the opening 20. As illustrated in the various figures, magnetic coupling strip 6 extends in a width direction from opposing side edges in substantially parallel alignment to the leading edge of the foldable screen long the perimeter of leading edge 12. In the illustrated embodiment, magnetic coupling strip 6 is a hem forming leading edge 12 of the foldable screen wherein a plurality of magnets 6A are transposed within stitched pockets dimensioned and spaced to securely couple the leading edge to a corresponding metallic bar 14 located along a front periphery of the opening which may also be header or top bar of the windshield frame. In the illustrated embodiment, magnetic closure strip 6 is interposed in a hem of foldable screen 2 open pore fabric or mesh. The pores or gaps of the mesh minimize obstruction or impedance of at least a portion of the magnetic field emitted by the magnets 6A so as to optimally secure the coupling interface of magnetic coupling strip 6 and metallic bar 14.

Metallic bar 14 may be any magnetic material configured and oriented so as to couple magnetic coupling strip such that the leading edge detachably affixes the sunshade to cover the opening when in the use position. Metallic bar 14 may be an original factory vehicle component or aftermarket magnetic or metallic bar, rod or shank configured for magnetic coupling to the vehicle sunshade.

Figure 2:
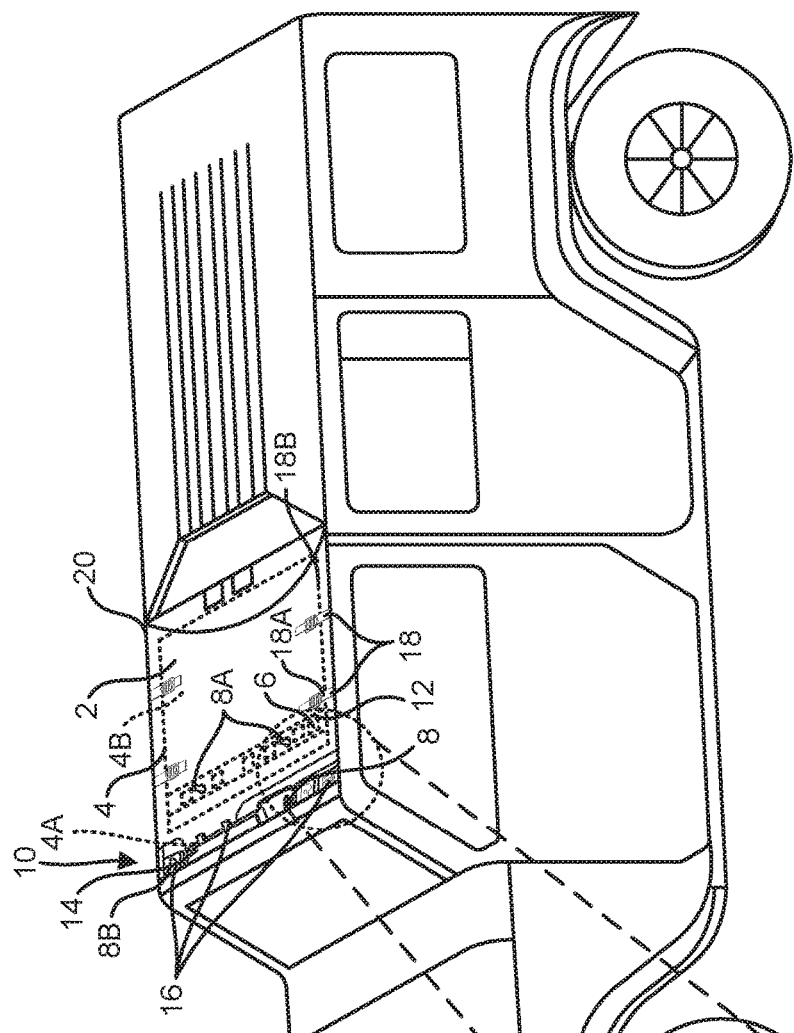
FIG. 2 illustrates a side perspective view of a vehicle sunshade for a roof top opening in accordance with a representative embodiment of the present invention when in a folded position.
Figure 2A:
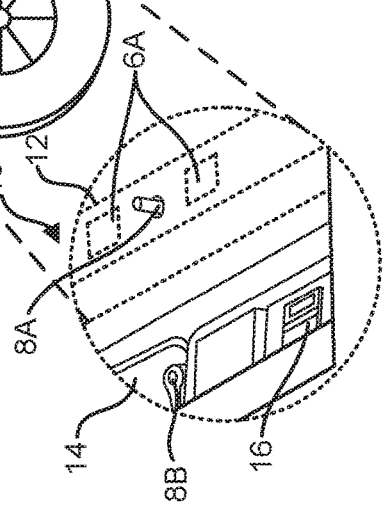
FIG. 2A illustrates a closer side perspective view of a vehicle sunshade for a roof top opening in accordance with a representative embodiment of the present invention when in a folded position.

As illustrated in FIGS. 1-4A, magnetic coupling strip 6 extends in a width direction from opposing side edges in substantially parallel alignment to the leading edge of the foldable screen, wherein the closure strip includes a plurality of magnets 6A dimensioned and spaced to securely couple the leading edge to a corresponding metallic bar located along a front periphery of the opening such that magnetic coupling of the magnetic coupling strip with the leading edge detachably affixes the sunshade to cover the opening when in the use position;

The invention further provides a live hinge 4 for maintaining a smoothly foldable and taut planar surface. As shown in dashed lines in FIGS. 1-4A, live hinge 4 includes a front panel 4A extending forward from a rear panel 4B pivotably connected to rear panel 4B about a hinge line 4C. When magnetic coupling strip 6 is coupled as depicted in FIG. 1, the front panel extends along a coplanar surface from rear panel such that foldable screen 10 is a continuous and taut planar surface over opening 10. When the magnetic coupler is decoupled as depicted in FIGS. 2 and 3, front panel 4A folds back to form a single planar layer upon the rear panel 4B.

In the illustrated embodiment, foldable screen 2 is composed of a mesh fabric with openings between woven threads and the magnets 6A are sewn within a hem extending along the leading edge 12. Dimensions of the vehicle roof top sunshade are adaptable to a corresponding roof top opening. 48 inches (122 cm) in width and 30 inches (76 cm) in length with an arcuately concave rear edge terminating into rearward extended straps 18C that are tightened about a central cab component below the vehicle roof top.

A further feature of the illustrated embodiment are locator protrusions in the form of a pair of pins 8A proximate to the leading edge 12; and a corresponding number of corresponding indentations in the form of a pair of female ports 8B proximate to the front periphery of the opening spaced to guide magnets 6A to optimize aligned coupling of magnetic coupler 6 upon mated engagement with pins 8A and ports 8B.

As illustrated in FIGS. 4 and 4A, a rear portion of opening 20 within which panel 4B of live hinge 4 is interposed, is removably mounted to a surface adjacent to corresponding peripheral edges of opening 20 by secured by tightening straps 18 to a corresponding roof top surface adjacent to a corresponding periphery of opening 20. It can be seen that straps 18A, 18B, and 18C are positioned to enhance maintaining taut seating of foldable screen 10 wherein the rear strap 18C of the representative embodiment is oriented at an angle tilted slightly toward the rear at an angle of, for example, 20 degrees from the perpendicular axis at which the front strap is oriented and also includes rear straps 8C for securing to an adjacent rear surface of opening 20.

Now referring to FIGS. 4 and 4A, a yet further feature of the present invention provided by foldable screen 10 is mounting the foldable screen to a periphery of the roof top opening such that a vehicle hard top 22 can be secured upon opening 20 without dismantling foldable screen 10. As illustrated, mounting straps 18 including 18A/18/B/18C are attached within a periphery of the roof top opening 10 whereby the vehicle hard top 22 may be mounted on top of sunshade 10 and secured to latches 16. In the illustrated embodiment, sunshade 10 is folded back in order to clear latches 16 such that the corresponding fasteners of hard top 22 can be engaged thereto. However, in other embodiments leading edge 12 and magnetic strip 6 may be oriented to enable such and other mechanisms to securely engage a vehicle roof top hard top 22 when sunshade 10 is extended over opening 20. Thus providing the convenience of facile covering by securing hard top 22 to close opening 20 without dismantling the sunshade 10. A particular advantage of retaining sunshade 10 over the opening is the convenient adaptation of roof top cover to prevailing weather conditions, particularly when storms thrusting sudden precipitation of rain, snow or even hail, that may dissipate as quickly as they emerge.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified.

As used in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of."

It should also be understood that certain conventional aspects or components may be substituted with alternative devices, mechanisms or materials. For example, various known fastening systems may be employed to mount the side and rear edges of the rear portion of the foldable screen to corresponding surfaces adjacent the corresponding peripheral edges of the roof top opening. Similarly, alternative locator systems exemplified by coupling pin 8A and port 8b may be alternative employed, including for example various locking pins, hook and eye mechanisms, bungie cords, knotting or locking line mechanisms or clasps may be alternatively used to guide and/or lock the magnetic closing strip 6 into coupled alignment with a corresponding metallic bar.

In the claims, as well as in the specification above, all transitional phrases such as "comprising," "including," "carrying," "having," "containing," "involving," "holding," "composed of," and the like are to be understood to be open-ended, i.e., to mean including but not limited to.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The invention claimed is:

1. A sunshade for a vehicle roof top opening defined by a front periphery and a rear periphery extending between opposing side peripheries with a transverse metallic bar proximately aligned with at least a portion of the front periphery, comprising
a foldable screen configured for mounted coverage of the opening, wherein the foldable screen has a front portion having a leading edge dimensioned for fitted correspondence to the front periphery of the opening and a rear portion configured for removeable mounted engagement with corresponding fasteners proximate to the opposing side peripheries and the rear periphery of the roof top opening; and
a coupling portion interposed proximate to the leading edge of the foldable screen, wherein the coupling portion includes one or more magnets dimensioned and spaced to magnetically couple the leading edge to an upper surface of the metallic bar such that magnetic coupling of the coupling portion and the metallic bar detachably secures the leading edge to the metallic bar whereby the sunshade is extended over the roof top opening such that the front portion and the rear portion form a substantially continuous surface when the one or more magnets is coupled with the metallic bar and the front portion may be folded back to lie flat upon an abutting surface of the rear portion when the coupling portion is decoupled to release the leading edge from the metallic bar.

2. The sunshade of claim 1, further comprising:
a live hinge interposed in the foldable screen, wherein the live hinge includes a front panel interposed in the front portion and a rear panel interposed in the rear portion, wherein the front panel has a first forward edge proximately aligned with the leading edge and a hinge line, wherein the front panel has a rearward edge proximately aligned with the hinge line and the rear panel has a second forward edge aligned with the rear edge of the front panel, whereby the front panel flexibly pivots about the hinge line such that the front portion and the rear portion form a substantially coplanar surface when the coupling portion is magnetically coupled to thereby attach the leading edge with the metallic bar and the front portion folds back in a single planar layer over an abutting surface of the rear panel when the coupling portion is decoupled.

3. The sunshade of claim 1, wherein the coupling portion is a strip including a plurality of magnets containing neodymium.

4. The sunshade of claim 2 wherein at least the rear portion of the foldable screen is mounted within the opposing side peripheries and a rear periphery of the roof top opening such that a vehicle hard top may be secured over the roof top opening when the sunshade is mounted upon the roof top opening.

5. The sunshade of claim 4, wherein the coupling portion extends along a the leading edge, and wherein the leading edge is composed of a mesh material constructed with an open pore fabric to minimize obstructing at least a portion of the magnetic field emitted by the magnets so as to enhance magnetic coupling of the coupling portion and the metallic bar.

6. The sunshade of claim 1, further comprising one or more locator members for guiding the coupling portion into aligned coupling with the metallic bar.

7. The sunshade of claim 6, wherein the locator members are a pair of pins proximate to the leading edge and a pair of corresponding ports proximate to the metallic bar dimensioned for mated engagement with the pair of pins.

8. The sunshade of claim 1, further comprising a plurality of straps affixed proximate to opposing sides and a rear edge of the foldable screen, wherein the plurality of straps are dimensioned and oriented for adaptively securing the sunshade, wherein a pair of the plurality of side straps are oriented at a rearward angle extending from a surface of the rear portion proximate to opposing junctions of the opposing second sides and the rear edge of the rear portion of the sunshade.

9. A sunshade for a vehicle roof top opening defined by a front periphery and a rear periphery extending between opposing side peripheries with a metallic bar proximately aligned with at least a portion of the front periphery, comprising:
a foldable screen dimensioned to cover the opening when extended in a use position wherein the foldable screen has a front portion and a rear portion, and wherein the front portion has a leading edge adjoining a pair of first opposing side edges, and wherein the leading edge is dimensioned for fitted correspondence to the front periphery of the opening and a rear portion having second opposing side edges configured for fitted correspondence to the opposing side peripheries of the vehicle roof top opening, and a rear edge configured for mounted correspondence to the rear periphery of the roof top opening, wherein the rear portion has a plurality of straps proximal to the second opposing side edges, wherein the rear portion is adapted for removeable mounted engagement with corresponding fasteners proximate to the opposing side peripheries and the rear periphery of the roof top opening;
a coupling portion extending in a width direction from opposing side edges proximal to the leading edge of the foldable screen, wherein the coupling portion includes one or more magnets dimensioned and spaced to magnetically couple the leading edge to an upper surface of the metallic bar such that magnetic coupling of the coupling portion and the metallic bar secures the leading edge to the metallic bar such that the foldable screen is extended over the roof top opening; and
a live hinge interposed in the foldable screen, wherein the live hinge includes a front panel, a rear panel and a hinge line, wherein the front panel is interposed within the front portion such that a forward edge of the front panel is proximally aligned along the leading edge and wherein the front panel has a rearward edge proximally aligned along the hinge line, wherein the rear panel is interposed in the rear portion, wherein the rear panel has a forward edge proximately aligned with the hinge line, whereby the front panel flexibly pivots about a hinge line such that the front portion and the rear portion form a substantially coplanar surface when the coupling portion is magnetically coupled with the metallic bar and the front portion folds back in a single planar layer over an abutting surface of the rear portion when the coupling portion is decoupled to release the leading edge from the metallic bar.

10. The sunshade of claim 9, wherein the coupling portion includes a plurality of magnets containing neodymium.

11. The sunshade of claim 9, wherein the magnets are sewn within a hem along the leading edge and the foldable screen is composed of a mesh material constructed with an open pore fabric to minimize obstructing at least a portion of the magnetic field emitted by the magnets so as to optimize secure coupling of the coupling portion and the metallic bar.

12. The sunshade of claim 9, further comprising one or more locator members for guiding the coupling portion into aligned coupling with the metallic bar.

13. The sunshade of claim 12, wherein the locator members include a pair of pins and the indentations are a pair of ports dimensioned for mated engagement with the pair of pins.

14. The sunshade of claim 9, whereby a vehicle hard top may be secured over the roof top opening in a closed position with the sunshade mounted on the roof top opening.

15. The sunshade of claim 9, further comprising a plurality of straps affixed proximate to the opposing second side edges and the rear edge of the foldable screen, wherein the plurality of straps are dimensioned and oriented for adaptively securing the sunshade, wherein a pair of the plurality of side straps are oriented at a rearward angle extending from a surface of the rear portion proximate to opposing junctions of the opposing second side edges and the rear edge of the rear portion.

16. A sunshade for covering a vehicle roof top opening defined by a front periphery and a rear periphery extending between opposing side peripheries when extended to magnetically couple with a metallic bar proximately aligned with at least a portion of the front periphery in a use position, comprising:
  a foldable screen having a leading edge portion adjoining a pair of opposing side edges wherein the leading edge portion is dimensioned for fitted correspondence to the front periphery of the roof top opening and a rear portion adapted for mounting onto a plurality of corresponding fasteners proximate to the opposing side peripheries and rear periphery; and
  a coupling strip extending in a width direction from opposing side edges proximal to the leading edge portion wherein the coupling strip includes a plurality of magnets dimensioned and spaced to securely couple the leading edge portion to the metallic bar such that magnetic coupling of the coupling strip and an upper surface of the metallic bar detachably secures the leading edge portion to the metallic bar whereby the sunshade is extended over the roof top opening.

17. The sunshade of claim 16, wherein the magnets contain neodymium, and wherein the coupling strip coextends along the leading edge portion and wherein the foldable screen is composed of a mesh material constructed with an open pore fabric to minimize obstructing at least a portion of the magnetic field emitted by the magnets so as to enhance magnetic coupling of the coupling strip and the metallic bar.

18. The sunshade of claim 16, wherein the magnets are sewn within a hem along the leading edge portion and the foldable screen is composed of a mesh material constructed with an open pore fabric to minimize obstructing at least a portion of the magnetic field emitted by the magnets so as to enhance the magnetic coupling of the coupling strip and the metallic bar.

19. The sunshade of claim 16, further comprising a pair of locator pins proximate to the leading edge portion and a pair of ports proximate to the metallic bar dimensioned for mated engagement with the pair of pins for thereby guiding the magnetic coupling strip into aligned coupling with the metallic bar.

20. The sunshade of claim 16, wherein at least the rear portion of the sunshade is mounted within the opposing side peripheries and the rear periphery of the roof top opening whereby a vehicle hard top may be secured over the roof top opening in a closed position with the sunshade mounted on the roof top opening.

* * * * *